Figure 1:
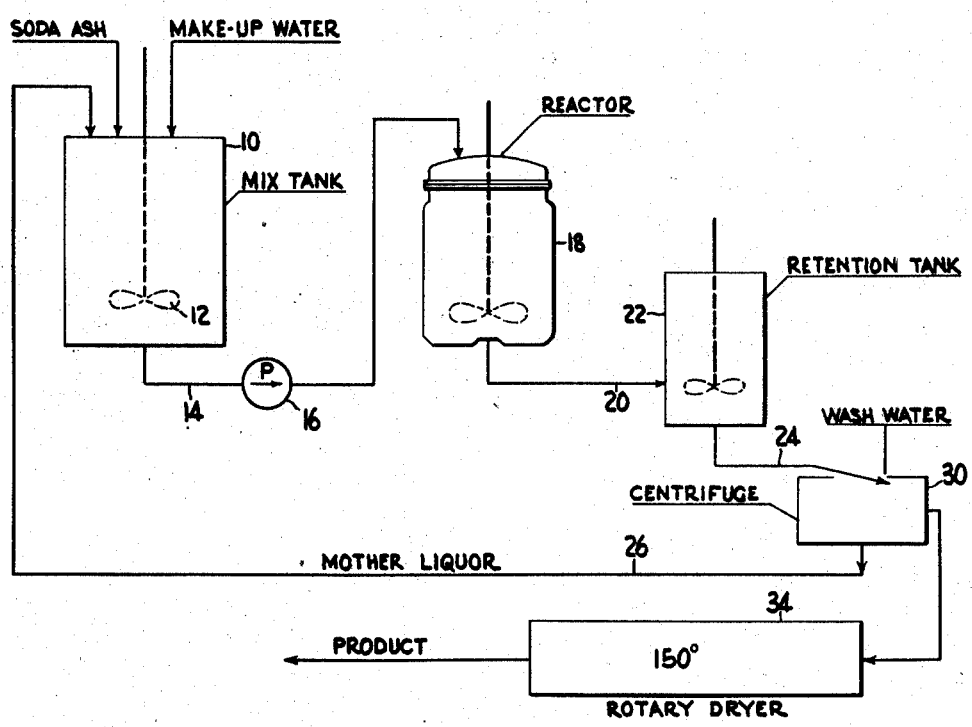

May 19, 1959  H. H. HOEKJE  2,887,360
PURIFICATION OF SODIUM CARBONATE MONOHYDRATE
Filed Dec. 7, 1956

INVENTOR.
HOWARD H. HOEKJE
BY
Oscar L. Spencer
ATTORNEY

United States Patent Office 2,887,360
Patented May 19, 1959

2,887,360

PURIFICATION OF SODIUM CARBONATE MONOHYDRATE

Howard H. Hoekje, Corpus Christi, Tex., assignor to Columbia-Southern Chemical Corporation, Allegheny County, Pa., a corporation of Delaware Application December 7, 1956, Serial No. 626,864

10 Claims. (Cl. 23—63)

The invention relates to a novel method of improving the character of sodium carbonate. Sodium carbonate supplied to the chemical industry includes that which is synthesized according to the ammonia-soda process and also that recovered from natural deposits and natural brines. Both of these materials contain certain impurities. Sodium carbonate produced by the ammonia-soda process contains small amounts, usually in the range of 0.1 to 1 percent by weight or more, of sodium chloride. Sodium carbonate produced from natural sources contains sodium chloride in this amount and frequently contains other impurities, including 0.1 to 1 percent by weight or more each of sodium sulphate and $SiO_2$ and and 0.01 to 0.5 percent or more of boron compounds (commonly reported in analyses as boron).

The purification of such sodium carbonate is complicated by the low price of this material. Only very low cost purification methods are feasible economically. The present invention provides such a method.

According to the present invention, the purity and appearance of sodium carbonate may be materially improved by forming an aqueous slurry of sodium carbonate monohydrate and heating the slurry until the undissolved solid sodium carbonate suspended in the slurry is converted substantially completely to unhydrated sodium carbonate crystals (so-called "anhydrous" crystals). Thereafter, the slurry is cooled to produce a slurry of sodium carbonate monohydrate crystals. This solid sodium carbonate is then separated from the mother liquor and a more pure product having improved appearance is obtained.

In sodium carbonate-water systems containing in excess of about 33 percent by weight sodium carbonate, the solid sodium carbonate in the system is in the form of sodium carbonate monohydrate at temperatures above about 35° C. and below about 112° C. At temperatures above the transition temperature which generally is about 112° C., the solid sodium carbonate converts to a crystal which is not hydrated, i.e., the crystal is essentially wholly sodium carbonate and contains no water of crystallization. When the system is cooled below 112° C., the solid reverts to the sodium carbonate monohydrate.

In the practice of the process herein contemplated, a slurry of sodium carbonate to be treated which contains at least 33 percent, usually 40 to 60 percent, by weight of sodium carbonate is prepared. In this slurry the solid sodium carbonate is in the form of the monohydrate at a temperature above about 35° C.

To improve color, a small amount of elemental chlorine is introduced into the slurry. This amount usually amounts to a few parts per million parts of sodium carbonate, rarely being in excess of one percent by weight of the sodium carbonate.

After the slurry is produced, the temperature is raised high enough to cause the solid to convert preponderantly to the unhydrated or anhydrous sodium carbonate. Under the usual conditions, this temperature is above about 112° C. and normally is in the range of about 115 to 150° C.

The mixture is held above the transition temperature for any convenient period of time, usually in excess of about 5 minutes. Thereafter, the slurry in which the sodium carbonate crystals are largely anhydrous or unhydrated crystals is cooled below the transition temperature (normally below 112° C.) whereby to cause the sodium carbonate to convert substantially wholly to the monohydrate. The slurry thus obtained is filtered to recover the solid carbonate therein. Such solid, which may be dried in the known manner, is found to be unusually high in purity.

In order to prevent coalescence of the product, it is important that the suspended solids content of the slurry of sodium carbonate monohydrate crystals produced by cooling the slurry of anhydrous sodium carbonate be at all events less than 75 percent by weight and preferably less than 50 percent by weight. Hence, evaporation of water beyond this point should be avoided or water should be added to the system to the extent necessary to accomplish this result.

The process may be conducted continuously or batchwise. In the batch process the slurry of monhydrate is placed in a kettle and heated under pressure above the transition temperature and thereafter cooled. The resulting monohydrate slurry is treated to recover the purified solid. Thus, the slurry may be filtered or centrifuged and washed to recover the monohydrate crystals and the product dried to produce soda ash (anhydrous sodium carbonate).

The process may be conducted continuously by establishing a heating tank and a cooling or retention tank. In the heating tank a slurry of monohydrate sodium carbonate slurry is heated above the transition temperature. A quantity of the resulting slurry of unhydrated crystals is pumped to a retention tank and cooled below the transition temperature. There is thus established in the heating tank a pool of slurry containing unhydrated sodium carbonate and in the retention tank a pool of monohydrate crystals. Thereupon, monohydrate slurry to be purified is fed batchwise or continuously to the pool in the heating tank and slurry is withdrawn in batches or continuously from the heating tank and fed to the retention tank. Slurry containing purified monohydrate crystals is then withdrawn periodically or continuously from the retention tank.

The temperature of the anhydrous slurry in the heating tank normally is maintained above 112° C. and the monohydrate slurry in the retention tank is held below 112° C., normally at about 60 to 100° C., rarely in any event below about 32 to 35° C.

The accompanying drawing diagrammatically illustrates an embodiment of the continuous process. As illustrated, water and solid sodium carbonate to be purified are supplied to a mix tank 10 equipped with an agitator 12. A slurry containing, for example, about 30 percent by weight of solids is thus made up at a suitable temperature, for example, 70° C. This slurry is pumped through line 14 by pump 16 to a jacketed agitated kettle 18 which is heated to a suitable temperature of about 120° C. Thus, the solid sodium carbonate in this kettle largely is in the anhydrous state, as heretofore explained. Portions of the anhydrous slurry are withdrawn through line 20 to retention tank 22 in which the temperature of the monohydrate pool is maintained below about 112° C., for example, 70 to 100° C. Monohydrate slurry thus obtained is conveyed through line 24 to a centrifuge 30 where monohydrate crystals are recovered and dried in a rotary dryer 34 at a suitable temperature, for example, 150° C. Mother liquor from the centrifuge is recycled to the mixing tank 10, with or without filtration, to remove solid impurities. Separation of the monohydrate from the mother liquor and production of a dense coarse product is best achieved when over 60 percent by weight of the product has a particle size over 30 mesh. This may be accomplished when the average retention time of the slurry in the monohydrate tank is substantial. Thus, the size of the pool and the rate of withdrawal should be such that the average retention time of the sodium carbonate monohydrate slurry in the retention tank should be at least 5 minutes.

The following examples are illustrative:

*Example I*

One hundred pounds of dry soda ash was slurried with 105 pounds of water. This slurry was chlorinated with elemental chlorine to 1.5 parts per million residual chlorine present as hypochlorite and pumped into a jacketed pressure reactor. The temperature of the slurry was raised to 120° C. and held there without vaporization of substantial water therefrom for two hours. The pressure in the kettle with the slurry heated to 120° C. was usually about 10 pounds per square inch. Thereafter, the steam flow to the jacket was cut off and the slurry temperature was lowered by atmospheric cooling. During this cooling period, the temperature was lowered to 105° C., increased rapidly to 112° C., and then began dropping again. At 75° C., the slurry was centrifuged. The centrifuge cake was washed and then dried for four hours in a rotary drier. The original soda ash had the following chemical composition, expressed as weight percent:

$Na_2CO_3$ -------------------------------------- 98.53
NaCl ------------------------------------------- 0.34
Boron ------------------------------------------ 0.067
$Na_2SO_4$ ---------------------------------------- 0.45
$SiO_2$ ------------------------------------------- 0.374

The product ash had the following chemical composition, expressed as weight percent:

$Na_2CO_3$ -------------------------------------- 99.91
NaCl ------------------------------------------- 0.01
Boron ------------------------------------------ 0.0021
$Na_2SO_4$ ---------------------------------------- 0.02
$SiO_2$ ------------------------------------------- 0.019

*Example II*

A slurry of sodium carbonate monohydrate containing 30 percent by weight of suspended solids was made in a mix tank by mixing soda ash with water. This slurry was chlorinated to 3.5 parts per million of residual chlorine as hypochlorite and pumped into a pressure reactor. The temperature of the slurry inside the reactor was raised to 120° C. and held at this temperature for 45 minutes. The steam flow to the jacket was cut off and the slurry temperature was reduced by atmospheric cooling. After the transition from the anhydrous state to the monohydrate state had taken place, a portion was fed to a retention tank. The reactor was then filled with more sodium carbonate slurry and the temperature raised to 120° C. for 30 minutes. At this point, continuous flows were started from the mix tank to the pressure reactor and from the reactor to the retention tank. The slurry in the mix tank was maintained at 70° C. throughout the run. The slurry was flashed directly into the retention tank where the temperature was usually in the range of 90 to 100° C. Periodically, approximately every 30 minutes, 5 to 8 gallons of slurry was withdrawn from the retention tank and centrifuged. The centrifuge cake was washed with demineralized water equal to 10 percent of the cake weight. The wash liquor was added to the mother liquor. The mother liquor and wash water were then weighed and recycled to the mix tank. Enough soda ash and boiler condensate were added to maintain a slurry containing 30 percent by weight of suspended solids. No purge was made on the system. Approximately every 5 hours, a centrifuge load was dried in the rotary dryer, which was run batchwise. The original soda ash had an average chemical composition as shown below (expressed as weight percent):

$Na_2CO_3$ -------------------------------------- 98.0
NaCl ------------------------------------------- 0.35
Boron ------------------------------------------ 0.10
$Na_2SO_4$ ---------------------------------------- 0.30
$SiO_2$ ------------------------------------------- 0.50

The second batch centrifuged had a chemical composition as follows (expressed as weight percent):

| Soda Ash | | Mother Liquor | |
|---|---|---|---|
| $Na_2CO_3$ | 99.91 | NaCl | 0.29 |
| NaCl | 0.01 | Boron | 0.08 |
| Boron | 0.0015 | $Na_2SO_4$ | 0.30 |
| $Na_2SO_4$ | 0.03 | $SiO_2$ | 0.47 |
| $SiO_2$ | 0.018 | $Na_2CO_3$ | 30.4 |

The 95th batch centrifuged had a chemical composition as follows (expressed as weight percent):

| Soda Ash | | Mother Liquor | |
|---|---|---|---|
| $Na_2CO_3$ | 99.88 | NaCl | 1.07 |
| NaCl | 0.01 | Boron | 0.14 |
| Boron | 0.0036 | $Na_2SO_4$ | 0.68 |
| $Na_2SO_4$ | 0.06 | $SiO_2$ | 0.74 |
| $SiO_2$ | 0.028 | $Na_2CO_3$ | 26.9 |

*Example III*

Sodium carbonate, 1499 grams, containing the impurities set forth in the table below was slurried with 1502 grams of water and held at 70° C. for three hours. The slurry was then filtered at 70° C. and the solid recovered was divided into two portions. One portion was analyzed. The other portion was dried at 140° C. overnight thus producing anhydrous sodium carbonate. Three hundred and thirty-seven grams of the dried portion was reslurried with 340 grams of water at about 70° C. and the solids recovered by filtration. The following is the analysis of impurities in the respective products.

| | Percent by Weight | | | |
|---|---|---|---|---|
| | NaCl | $Na_2SO_4$ | Boron | $SiO_2$ |
| Initial sodium carbonate | 0.15 | 0.45 | 0.22 | 0.59 |
| Solids recovered after first slurrying | 0.01 | 0.13 | 0.04 | 0.13 |
| Solids recovered from slurry produced by reslurrying dried sodium carbonate | <0.01 | 0.05 | 0.02 | 0.065 |

While the above examples describe the process beginning with dry soda ash, it is also possible to treat monohydrate slurry produced from other sources.

Moreover, the chlorine may be introduced while the slurry has a temperature above 112° C. and the solid is present as unhydrated crystals.

Although the present invention has been described with particular reference to the specific details of certain embodiments thereof, it is not intended to exclude other embodiments except to the extent that they are not included within the scope of the accompanying claims and their equivalents.

What is claimed:

1. A method of purifying impure sodium carbonate which is contaminated with an impurity of the group consisting of boron compounds, silica, chloride and sulphate which comprises forming an aqueous slurry of said impure sodium carbonate in which solid sodium carbonate therein is present as sodium carbonate monohydrate crystals, raising the temperature of said slurry to above the sodium carbonate monohydrate-unhydrated sodium carbonate transition temperature of about 112° C. until the sodium carbonate monohydrate crystals are converted to unhydrated sodium carbonate crystals, thereafter cooling the slurry to cause reformation of sodium carbonate monohydrate, thus forming a mother liquor having impurities of said impure sodium carbonate dissolved therein in which the reformed sodium carbonate monohydrate is in contact, and removing the mother liquor from the reformed sodium carbonate monohydrate.

2. A method of purifying sodium carbonate which is contaminated with an impurity of the group consisting of boron compounds, silica, chloride and sulphate which comprises forming an aqueous slurry of sodium carbonate containing said impurity in which solid sodium carbonate therein is present as solid sodium carbonate monohydrate, heating the slurry to above the sodium carbonate monohydrate-unhydrated sodium carbonate transition temperature of about 112° C. to convert the solid monohydrate to unhydrated sodium carbonate crystals, cooling the slurry to reconvert the solid sodium carbonate to solid sodium carbonate monohydrate disposed in a mother liquor having said impurity dissolved therein, and recovering the solid sodium carbonate thus obtained from the mother liquor.

3. A method of purifying sodium carbonate which is contaminated with an impurity of the group consisting of boron compounds, silica, chloride and sulphate which comprises forming an aqueous slurry of said sodium carbonate in which solid sodium carbonate is present as the sodium carbonate monohydrate, heating said solid to above the sodium carbonate monohydrate-unhydrated sodium carbonate transition temperature of about 112° C. to convert the solid sodium carbonate to unhydrated solid sodium carbonate and thereafter hydrating the unhydrated sodium carbonate to regenerate sodium carbonate monohydrate in aqueous medium and recovering the resulting monohydrate from said medium.

4. In the purification of sodium carbonate containing an impurity of the group consisting of boron compounds, silica, chloride and sulphate, the improvement which comprises forming an aqueous slurry of unhydrated solid sodium carbonate at a temperature above the sodium carbonate monohydrate-unhydrated sodium carbonate transition temperature of about 112° C., cooling the slurry to produce a slurry of solid sodium carbonate monohydrate, while maintaining enough water therein to maintain the solids content of the resulting monohydrate slurry below 75 percent by weight, and separating the resulting monohydrate from the mother liquor of the slurry.

5. In the purification of sodium carbonate containing an impurity of the group consisting of boron compounds, chloride, silica, and sulphate, the improvement which comprises forming an aqueous slurry of unhydrated solid sodium carbonate, at a temperature above the sodium carbonate monohydrate-unhydrated sodium carbonate transition temperature of about 112° C. said slurry containing an impurity of said group, cooling the slurry to produce a slurry of solid sodium carbonate monohydrate, maintaining enough water in said monohydrate slurry to maintain the solids content thereof below 75 percent by weight, and separating the resulting solid monohydrate from the mother liquor of said slurry.

6. The process of claim 5 wherein sufficient water is provided in the slurry to maintain the solid content of the resulting slurry of sodium carbonate monohydrate below 50 percent by weight.

7. A method of purifying an aqueous slurry of sodium carbonate monohydrate which contains an impurity of the group consisting of boron compounds, silca, chloride and sulphate which comprises feeding said slurry into a first pool of an aqueous suspension of solid unhydrated sodium carbonate while maintaining the temperature of said pool above about 112° C. and thereby to convert the monohydrate of said slurry to solid unhydrated sodium carbonate, feeding the resulting aqueous suspension to a second pool which is maintained at a temperature below about 112° C. whereby to regenerate solid sodium carbonate monohydrate in said second pool and to form a mother liquor containing said impurity dissolved therein, and separating said regenerated monohydrate from said mother liquor.

8. A method of purifying an aqueous slurry of sodium carbonate monohydrate which contains an impurity of the group consisting of boron compounds, silica, chloride and sulphate which comprises feeding said slurry into a first pool of an aqueous suspension of solid unhydrated sodium carbonate while maintaining the temperature of said pool above about 112° C. and thereby to convert the monohydrate of said slurry to solid unhydrated sodium carbonate, feeding the resulting aqueous suspension to a second pool which is maintained at a temperature below about 112° C. whereby to regenerate solid sodium carbonate monohydrate in said second pool and to form a mother liquor containing said impurity dissolved therein, and separating said regenerated monohydrate from said mother liquor while providing enough water in said mother liquor so that the solids content of the resulting mother liquor-regenerated monohydrate mixture is below 75 percent by weight.

9. A method of purifying an aqueous slurry of sodium carbonate monohydrate which contains an impurity of the group consisting of boron compounds, silica, chloride and sulphate which comprises feeding said slurry into a first pool of an aqueous suspension of solid unhydrated sodium carbonate while maintaining the temperature of said pool above about 112° C. and thereby to convert the monohydrate of said slurry to solid unhydrated sodium carbonate, feeding the resulting aqueous suspension to a second pool which is maintained at a temperature below about 112° C. whereby to regenrate solid sodium carbonate monohydrate in said second pool and to form a mother liquor containing said impurity dissolved therein, maintaining said regenerated monohydrate in contact with said mother liquor for at least 5 minutes, and thereafter separating said regenerated monhydrate from said mother liquor.

10. A method of purifying an aqueous slurry of sodium carbonate monohydrate which contains an impurity of the group consisting of boron compounds, silica, chloride and sulphate which comprises feeding said slurry into a first pool of an aqueous suspension of solid unhydrated sodium carbonate while maintaining the temperature of said pool above about 112° C. and thereby to convert the monohydrate of said slurry to solid unhydrated sodium carbonate, feeding the resulting aqueous suspension to a second pool which is maintained at a temperature below about 112° C. whereby to regenerate solid sodium carbonate monohydrate in said second pool and to form a mother liquor containing said impurity dissolved therein, maintaining said regenerated monohydrate in contact with said mother liquor for at least 5 minutes, and thereafter separating said regenerated monohydrate from said mother liquor while providing enough water in said mother liquor so that the solids content of the resulting mother liquor-regenerated monohydrate mixture is below 75 percent by weight.

References Cited in the file of this patent
UNITED STATES PATENTS 1,907,987    Lynn  ---------------- May 9, 1933